(12) United States Patent
Tokumasu

(10) Patent No.: US 9,334,997 B1
(45) Date of Patent: May 10, 2016

(54) PIPE VIBRATION CONTROL SYSTEM

(71) Applicant: Katsuyoshi Tokumasu, Mouka (JP)

(72) Inventor: Katsuyoshi Tokumasu, Mouka (JP)

(73) Assignee: Tokushin Denki Co., Ltd., Mouka-Shi, Tochigi-Ken (JP)

( * ) Notice: Subject to any disclaimer, the term of this patent is extended or adjusted under 35 U.S.C. 154(b) by 0 days.

(21) Appl. No.: 14/674,431

(22) Filed: Mar. 31, 2015

(30) Foreign Application Priority Data

Dec. 5, 2014 (JP) .................. 2014-246938

(51) Int. Cl.
| | |
|---|---|
| *F16M 13/00* | (2006.01) |
| *F16L 55/035* | (2006.01) |
| *F16L 3/08* | (2006.01) |
| *F16L 3/18* | (2006.01) |
| *F16M 13/02* | (2006.01) |

(52) U.S. Cl.
CPC .............. *F16L 55/035* (2013.01); *F16L 3/085* (2013.01); *F16L 3/18* (2013.01); *F16M 13/027* (2013.01)

(58) Field of Classification Search
CPC ........... F16F 9/006; F16L 3/18; F16L 55/035; F16L 3/085; F16L 13/027
See application file for complete search history.

(56) References Cited

U.S. PATENT DOCUMENTS

| | | | | |
|---|---|---|---|---|
| 2,587,150 A | * | 2/1952 | Hansen .................. | D06F 57/125 211/113 |
| 3,572,623 A | * | 3/1971 | Lapp ......................... | F16L 3/24 248/72 |
| 4,483,500 A | * | 11/1984 | Brussalis, Jr. ............. | F16L 3/18 248/58 |
| 5,590,859 A | * | 1/1997 | Lord ....................... | F16L 3/133 248/218.4 |
| 8,215,075 B2 | * | 7/2012 | Bergman .................. | E04B 9/20 248/324 |
| 2002/0113351 A1 | * | 8/2002 | Kato ....................... | F16F 7/108 267/141 |
| 2003/0119390 A1 | * | 6/2003 | Riach ...................... | F16F 9/006 441/133 |
| 2009/0188203 A1 | * | 7/2009 | Fox .......................... | H02G 3/32 52/741.3 |

FOREIGN PATENT DOCUMENTS

JP          3152656          8/2009

\* cited by examiner

*Primary Examiner* — Amy Sterling
(74) *Attorney, Agent, or Firm* — Wallace G. Walter

(57) ABSTRACT

A pipe vibration control system for preventing a high vibration of pipes hung and supported at a ceiling, it capable of effectively preventing a high vibration of the pipe without damaging the pipe when occurred the strong earthquake.

A pipe vibration control system comprise a pipe vibration control device in which it constitutes a frame including vertical members fixed at a ceiling to arrange at both sides of the pipe and lateral members fixed at the vertical members to arrange at the upper and the lower portions of the pipe, the vertical members and the lateral members constitute the frame to enclose the pipe under no-contacted state while keeping spaces in upward, downward, rightward and leftward directions, and the pipe vibration control devices are arranged two or more locations around a pipe line of the pipe hung and supported at the ceiling and a pipe line in a direction crossing at a right angle with the former pipe line.

10 Claims, 5 Drawing Sheets

PIPE VIBRATION CONTROL SYSTEM

BACKGROUND OF INVENTION

1. Field of Invention

This invention relates to a technical field concerning a pipe vibration control system for preventing a high vibration of pipe hung and supported at a ceiling and the like.

2. Description of Related Art

In recent years, it has confirmed that the heavy pipe (filled with water, hydrant and the like) for sprinkler (hung and supported with hanger bolts and the like at a ceiling) is vibrated in a high amplitude and then dropped from the ceiling when occurred the strong earthquake. Due to this fact, it is required to develop a new technology for preventing a high vibration of the pipe effectively.

As the conventional technology for preventing a high vibration of the pipe, it has been well known in the art to provide a technology described in the patent document 1, for example.

The patent document 1 has a description about a technology, a so-called 3-point hanging structure in which the pipe is hung at a ceiling with hanger bolts for use in support it while being hung.

The technology in the patent document 1 is described at positively preventing a high vibration of the pipe by restricting the vibration of the pipe from three directions.

PRIOR ART DOCUMENT

Patent Documents

Cited reference 1: Japanese Utility-model unexamined Publication No. 3152656.

SUMMARY OF THE INVENTION

Problem to be Solved by the Invention

The technology described in the patent document 1 shows a problem that if the pipe vibrates strongly when occurred the strong earthquake, a stress is concentrated at the hanger bolts and a part of the pipe is damaged or broken.

This invention has been devised in view of the problem described above and it is an object of this invention to provide a pipe vibration control system capable of effectively preventing a high vibration of the pipe without damaging the pipe when occurred the strong earthquake.

DISCLOSURE OF THE INVENTION

In order to solve the above-mentioned problem, a pipe vibration control system of this invention employs the means described in Claims 1 to 4.

That is, the pipe vibration control system described in Claim 1 of the present invention, comprises a pipe vibration control device in which it constitutes a frame including vertical members fixed at a ceiling to arrange at both sides of the pipe and lateral members fixed at the vertical members to arrange at upper and lower portions of the pipe, the vertical members and the lateral members constitute the frame to enclose the pipe under no-contacted state while keeping spaces in upward, downward, rightward and leftward directions, and the pipe vibration control devices are arranged two or more locations along a pipe line of the pipe hung and supported at the ceiling and a pipe line in a direction crossing at a right angle with the pipe line.

The pipe vibration control system described in Claim 2 of the present invention, a pipe vibration control device in which it constitutes a frame including vertical members fixed at a ceiling to arrange at both sides of the pipe and lateral members fixed at the vertical members to arrange at upper and lower portions of the pipe, the vertical members and the lateral members constitute the frame to enclose the pipe under no-contacted state while keeping spaces in upward, downward, rightward and leftward directions, and the pipe vibration control devices are arranged two or more locations around a pipe line of the pipe hung and supported at a ceiling and an auxiliary pipe fixed in a direction toward a direction crossing at a right angle with the pipe.

In the Claim 3, the pipe vibration control system according to Claims 1 and 2, wherein several long holes are formed at regularly intervals in length directions of the vertical members and the lateral members of the pipe vibration control device.

In the Claim 4, the pipe vibration control system according to Claims 1 to 3, wherein cushion materials are attached to the surfaces opposing against the pipes or the auxiliary pipes of the vertical members and the lateral members.

The pipe vibration control system of Claim 1 of the present invention shows that the vertical members and the lateral members of the pipe vibration control devices to enclose the pipe under no-contacted state to allow their natural vibration to be carried out in the case that an amplitude of vibration of the pipe is less than a specified value. In turn restrict the vibration in the case that the amplitude becomes larger than the specified value. As a result, in the case that the amplitude of vibration of the pipe is less than a specified value, an entire oscillation caused by the natural vibration is promoted, and lastly it can be converged under a self-absorption action of vibration energy caused by an attenuation in vibration, and a concentration of stress of vibration to a certain part caused by fixed state is avoided.

In turn, the amplitude of vibration becomes lager than a specified value, the width of vibration is restricted to a value less than a specified value, so that they may not be damaged under a tremendous amount of vibration such as the strong earthquake and the like.

In addition, since the pipe vibration control devices are arranged two or more locations around a pipe line of the pipe hung and supported at the ceiling, and a pipe line in a direction crossing at a right angle with the pipe line, in the case that a vibration is applied from a direction in parallel with one pipe line, the vibration pass through a passing-through direction because the frame of the pipe vibration control device is arranged around in a direction where is passed through by it, so that it does not work to control the vibration. However, the another pipe vibration control device is arranged around a pipe line in a direction crossing at a right angle with the former pipe line may act to control vibration. In turn restrict, in the case that a vibration is applied from a direction crossing at a right angle with one pipe line, the pipe vibration control device is arranged around the pipe line in a direction crossing at a right angle, to the vibration does not work to control the vibration. However, the another pipe vibration control device is arranged around the pipe line in a direction parallel for the vibration may act to control vibration.

Accordingly, even if their weak points are supported to each other and in the case that a vibration is applied from any one of either the direction in parallel or the direction crossing at a right angle, and so effectively function of preventing a high vibration by the frame to enclose the pipe under no-contacted state to be always act.

The pipe vibration control system of Claim 2 of the present invention shows that the actions and effects similarly to those of the pipe vibration control system described in Claim 1 can be realized by a system that is arranged two or more locations around a pipe line of the pipe hung and supported at a ceiling and the auxiliary pipe fixed toward a direction crossing at a right angle with the pipe.

In Claim 3 of the present invention, positions of bolts and nuts (fixed in the long holes are formed in length directions of the vertical members and lateral members) are changed to enable a relative distance between the pipe and the space to be varied and a size of the space to be finely adjusted.

Further, in Claim 4 of the present invention, it shows an effect that cushion materials are attached to the vertical and the lateral members of the pipe vibration control device to cause shock when the pipe or the auxiliary pipe is contacted with the vertical members and the lateral members to be dampened, so that the pipe or the auxiliary pipe contacted with the vertical members and the lateral members is prevented from being damaged.

BEST MODE FOR CARRYING OUT INVENTION

Figure 1:
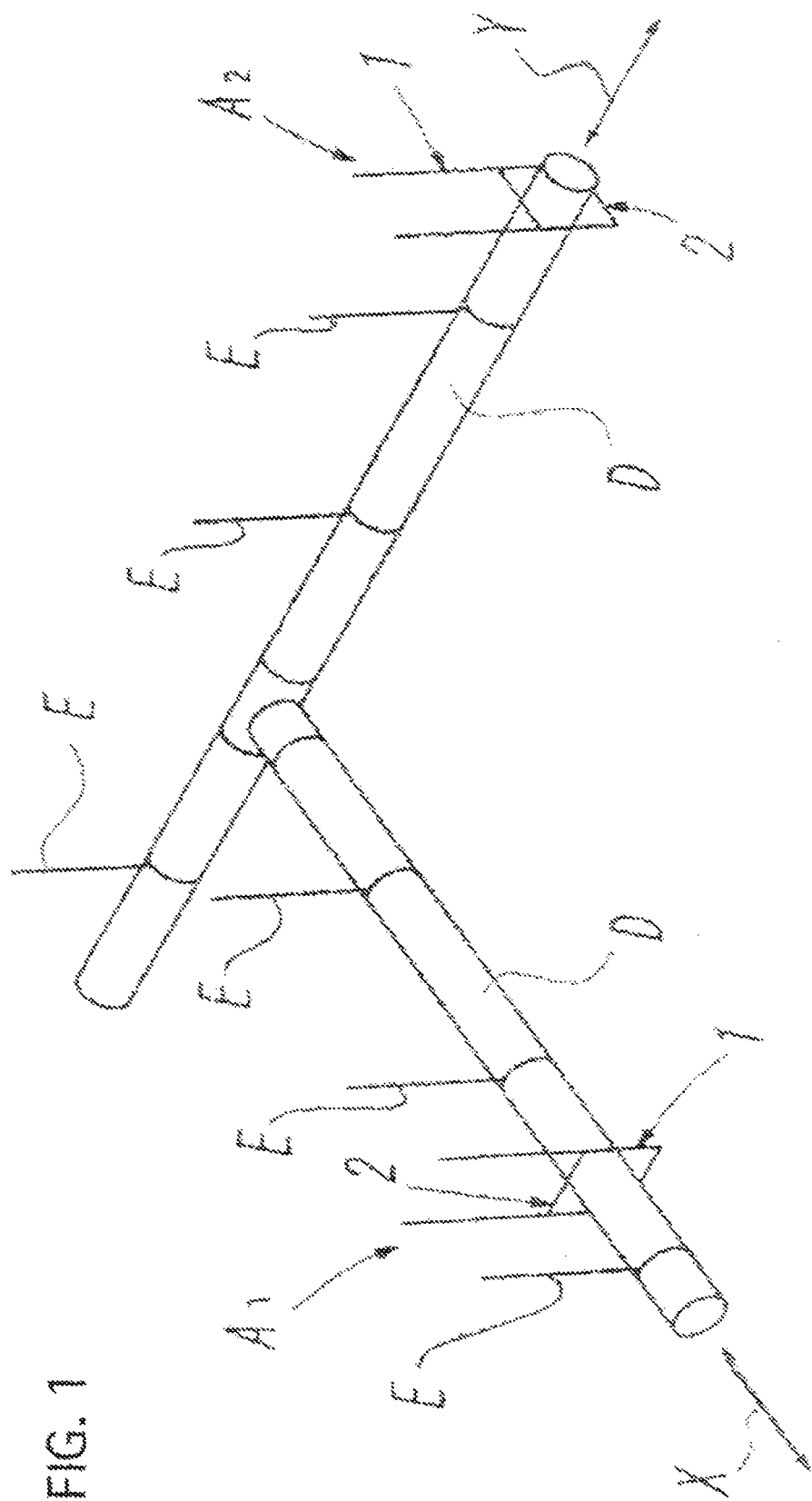
FIG. 1 is a perspective view showing the state of the pipe vibration control system in the first embodiment of the present invention.

Further, referring to the drawings, a preferred embodiment of the pipe vibration control system of the present invention will be described as follows.

Figure 2:
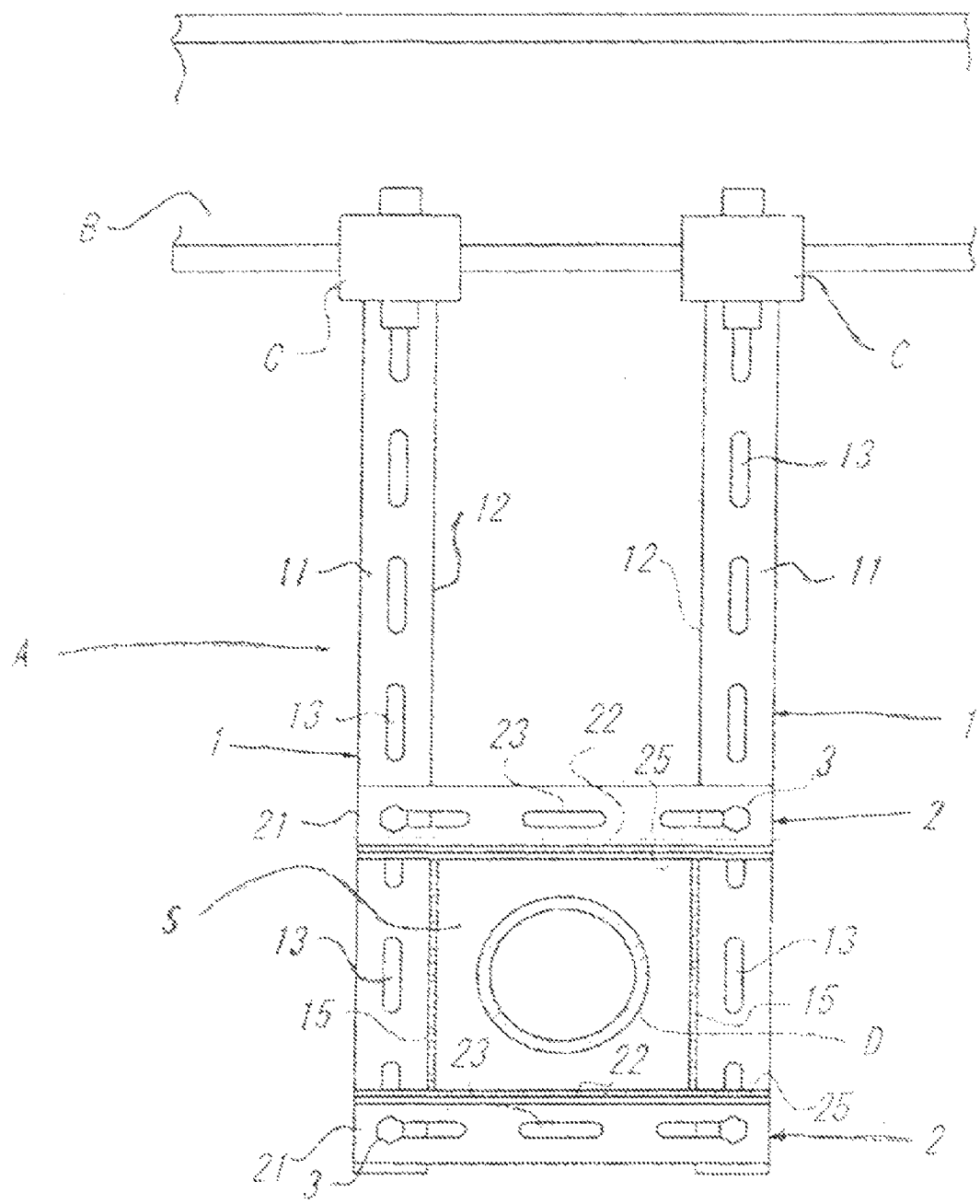
FIG. 2 is a front view of the essential portion of FIG. 1.
Figure 3:
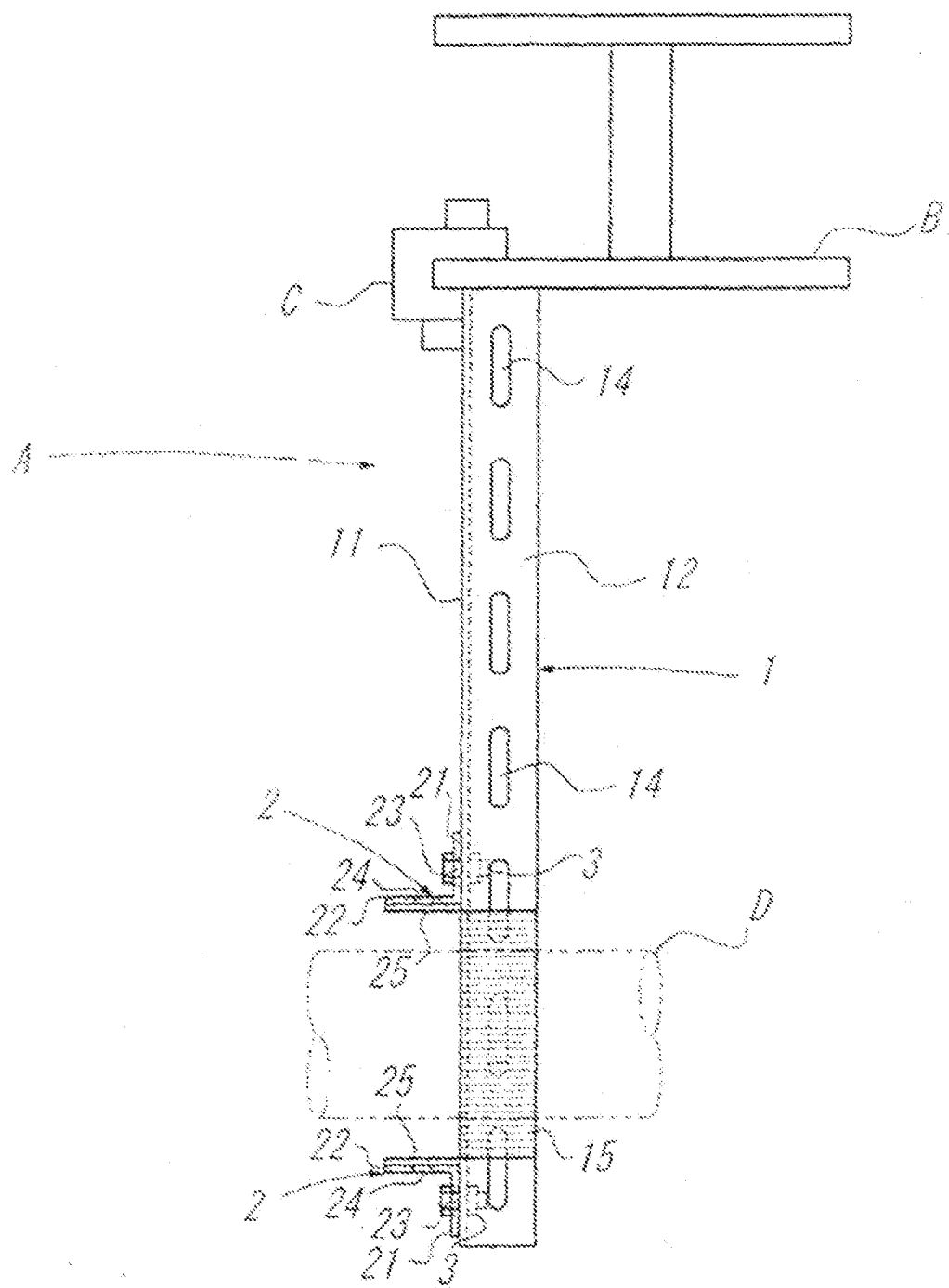
FIG. 3 is a vertical cross sectional view of FIG. 2.

FIGS. 1 to 3 illustrate the first example of the preferred embodiment for carrying out the pipe vibration control system of the present invention.

In the first example, as shown in FIG. 1, pipes for a sprinkler facility hung and supported by hanger bolts E at a ceiling (and the like) are illustrated as pipes D to be controlled against its vibration. Provided that details of the branch pipes, sprinkler terminal and the like are eliminated.

In the first example, the pipe vibration control devices A (A1, A2) are arranged two or more locations around the pipe line (X-axis direction) of a pipe D and a pipe line (Y-axis direction) in a direction crossing at a right angle with the former pipe line.

As illustrated in detail in FIGS. 2 and 3, the pipe vibration control device A consists of the vertical members 1 and the lateral members 2 formed by common angle material.

The vertical member 1 of the pipe vibration control device A having two surfaces 11, 12 being L-shape in cross section and is made of angled material, and several long holes 13, 14 are formed at regularly intervals in the length direction of the surfaces 11, 12.

The vertical member 1 is made such that two members are set as one unit, and attached to a beam B of H-shape steel acting as a ceiling by clamps C engaged with the long holes 13 and then the vertical members to arrange at both sides of the pipe D hung and supported with hanger bolts at a ceiling. Cushion materials 15 made of rubber (and the like) are attached to portions of the surface 12 facing the pipe D having possibility that they may contact with the pipe D.

The lateral member 2 of the pipe vibration control device A having two surfaces 21, 22 being L-shape in cross section and is made of angled material, and several long holes 23, 24 are formed at regularly intervals in the length direction of the surfaces 21, 22.

The lateral member 2 is made such that two members are set as one unit, and they are fixed to the vertical members 1 with bolts and nuts 3 under utilization of long holes 23, 24 (including long holes 13, 14 of the vertical members 1) and they are arranged at the upper and lower portions of the pipe D.

Cushion materials 25 made of rubber (and the like) are attached to portions of the surface 22 facing the pipe D having possibility that they may contact with the pipe D.

Fixing work of the vertical members 1 and the lateral members 2 of the pipe vibration control device A are not limited to the case of a new installation of the pipe D, but it can be easily performed also for an existing pipe D.

The fixed vertical members and lateral members of the pipe vibration control device A constitute the frame to enclose the pipe D under no-contacted state while keeping spaces in upward, downward, rightward and leftward directions.

Although a vertical size and a lateral size of the space S of the frame are approximately determined by a length of vertical members and a length of lateral members, fixed positions of the bolts and nuts are changed under utilization of long holes of the vertical members and the lateral members to enable a size of the space S to be varied and a distance to the pipe to be finely adjusted.

According to the first preferred embodiment, the vertical members 1 and the lateral members 2 of the pipe vibration control devices A to enclose the pipe D under no-contacted state to allow their natural vibration to be carried out in the case that an amplitude of vibration of the pipe D is less than a specified value. In turn restrict the vibration in the case that the amplitude becomes larger than the specified value. As a result, in the case that there occurs a vibration with a width less than a specified value, an entire oscillation caused by the natural vibration is promoted and a concentration of stress of vibration to a certain part caused by fixed state is avoided.

That is, even if a slight vibration less than a specified width is allowed, the slight oscillation influences over the entire pipe and lastly it can be converged under a self-absorption action of vibration energy caused by an attenuation in vibration. In turn, if they are fixed without allowing any vibration, the vibration is concentrated at a local part in the pipe facility, so that even if they can endure against once or twice vibration, its repetitive application of vibration may finally lead to a damage.

In turn, if a vibration more than a specified value occurs and the vibration is left as it is, an oscillation width caused by vibration becomes high, the pipe strongly strikes against other facilities or damages and may be dropped from the hanger unit and a severe dangerous state may occur.

In view of this fact, if there are provided the pipe vibration control devices A where the vertical members 1 and the lateral members 2 to enclose the pipe D under no-contacted state, the frame formed by the vertical members 1 and the lateral members 2 acts to restrict vibration against more vibration and the width of vibration is restricted to a value less than a specified value, so that they may not be damaged under a tremendous amount of vibration such as the strong earthquake and the like.

Further, the cushion materials 15 for the vertical members 1 and the cushion materials 25 for the lateral members 2 are helpful for preventing the pipe D contacting with the vertical members 1 and the lateral members 2 from being damaged.

Then, since the vertical members 1 and the lateral members 2 of the pipe vibration control devices A constitute the frame to enclose the pipe D, if the hanger bolts and the like that hanging and supporting for the pipe are broken, the lateral members 2 to arrange at the lower portion of the pipe are possible to prevent that the pipe D dropped out from the ceiling.

In addition, since the pipe vibration control devices A are arranged a plurality of locations in directions where the pipe lines of the pipes D are crossing to each other at a right angle, weak points having no vibration preventing functions in X-axis direction or Y-axis direction are supported to each other. As a result, it is possible to prevent effectively vibration of the pipes D when occurred the strong earthquake for entire pipe lines (all directions) of the pipes D.

For example, in the case that a vibration is applied from a direction in parallel with one pipe line (X-axis direction), the vibration pass through a passing-through direction because the frame of the pipe vibration control device A1 is arranged around the pipe D installed in the X-axis direction is passed through by it, so that it does not work to control the vibration. However, in this case, the frame of the pipe vibration control device A2 arranged around the pipe line in a direction crossing at a right angle with the former pipe line (Y-axis direction) may act to control vibration.

In turn, in the case that a vibration occurs from the Y-axis direction with the pipe line in the X-axis direction, a phenomenon opposite to the vibration occurs and in place of the pipe vibration control device A2 not performing any vibration control operation, the frame of the pipe vibration control device A1 arranged around the pipe line in a direction crossing at a right angle with the Y-axis acts to control the vibration. Accordingly, even if their weak points are supported to each other and in the case that a vibration occurs from any one of either the X-axis direction or the Y-axis direction, so effectively function of the pipe vibration control devices may act and the vibration to be always controlled.

Similar situation can be applied for a case in which an auxiliary pipe is installed. For example, in the case that a vibration is applied from a X-axis direction to one pipe line (a pipe line in a X-axis direction), the pipe vibration control device A1 does not work to control it, but the pipe vibration control device A2 arranged around the auxiliary pipe fixed toward a direction (Y-axis direction) crossing at a right angle with the former one may act to control over the vibration. In turn, in the case that there occurs a vibration in a direction of Y-axis, a phenomenon opposite to the former occurs and in place of the pipe vibration control device A2, the pipe vibration control device A1 arranged at the pipe line in a direction crossing at a right angle with the Y-axis may act to control the vibration. Accordingly, even if their weak points are supported to each other and a vibration occurs from any the direction, so effectively function of the pipe vibration control devices may act and the vibration to be always controlled.

Further, in the case that a vibration occurs in an upward or downward direction, the present pipe vibration control devices have no such weak points as described above, but the present pipe vibration control devices may show an effective function for allowing a slight vibration of less than a specified width in the vertical direction to be accepted and control such a larger vibration than that of more than the specified value. Then, this function may act as more uniform vibration control function if the number of the present pipe vibration control devices is many and they are entirely arranged while being dispersed.

Figure 4:
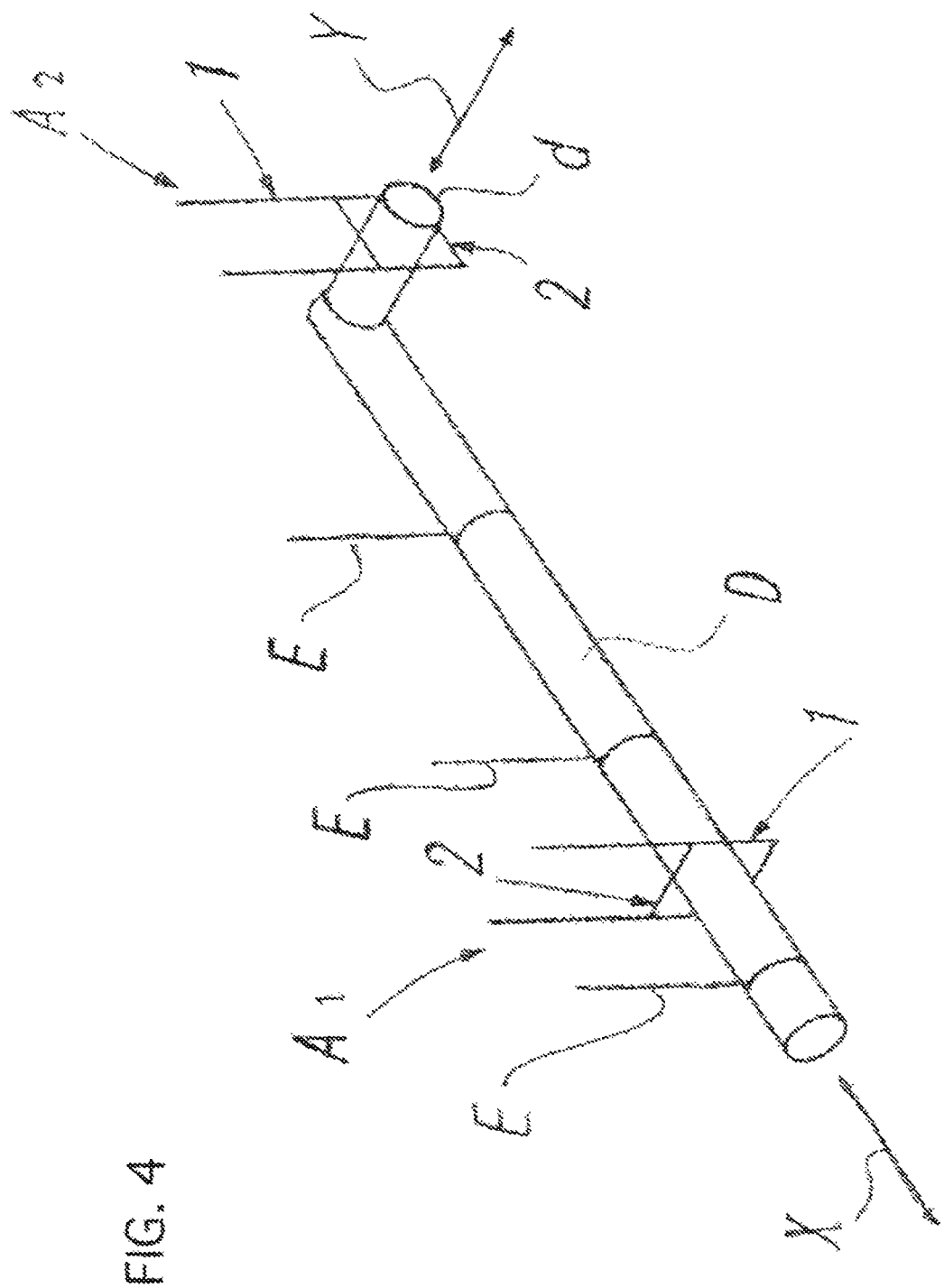
FIG. 4 is a perspective view showing the state of the pipe vibration control system in the second embodiment of the present invention.

FIG. 4 is illustrate the second example of the preferred embodiment for carrying out the pipe vibration control system of the present invention.

In the second preferred embodiment of this invention, the pipe vibration control devices A are arranged around the pipe D and the auxiliary pipe (d) as fixed toward directions crossing at a right angle in terminals of the pipe D. Although the auxiliary pipe (d) is short in its length, its material is preferably similar to that of the pipe P and connecting work for pipes to each other can be similarly carried out. The auxiliary pipe can be use by applying a short pipe similar to the pipe D.

In according to the second preferred embodiment, since the auxiliary pipe (d) is regards as the pipe D for the pipe vibration control devices A, the present invention can be carried out even if the pipe D is not extended forcibly in the case that the pipe D is installed in a long straight-line form. In addition, the auxiliary pipe (d) has preferably the same diameter as that of the pipe D.

Figure 5:
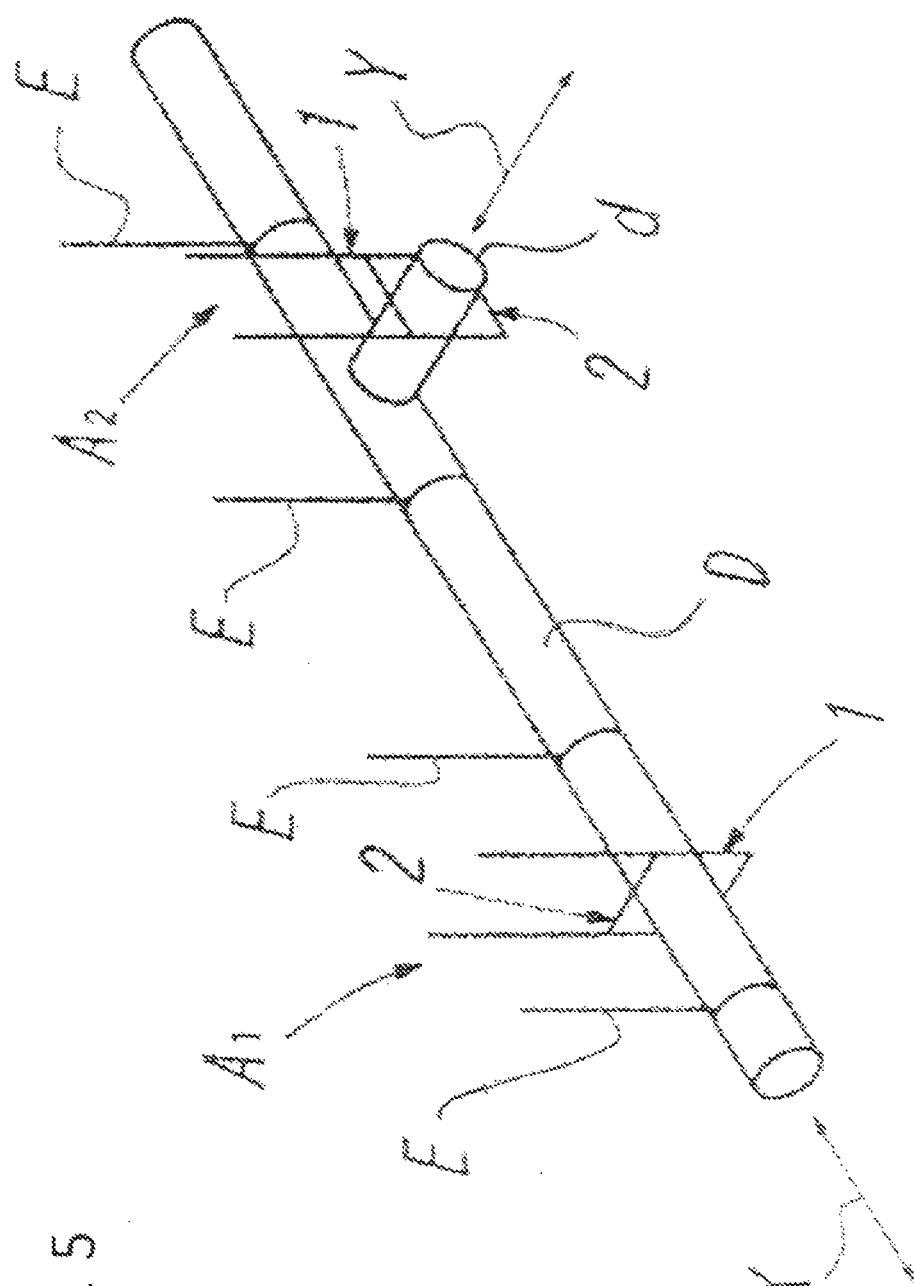
FIG. 5 is a perspective view showing the state of the pipe vibration control system in the third embodiment of the present invention.

FIG. 5 illustrates the third example of the preferred embodiment for carrying out the pipe vibration control system of the present invention.

In the third preferred embodiment, the auxiliary pipe (d) of the second preferred embodiment is fixed at the middle part of the pipe line of the pipe D.

In addition, the actions and effects similarly to those of the second preferred embodiment, the third preferred embodiment has advantage that it can be carried out while avoiding a wall surface of the terminal of the pipe line for the pipe D.

In besides the foregoing arrangement of each of the embodiments shown, it is possible to fix the vertical members 1 of the pipe vibration control device A at a ceiling other than the beam B. Additionally, it is also possible to use a unit other than the clamps C when the vertical members 1 of the pipe vibration control device A.

Further, the present invention can be adapted for the case in which three or more vertical members 1 and lateral members 2 (of the pipe vibration control device A) are prepared to enable the present invention to be also applied for the case in which a plurality of pipes D are installed upward, downward, rightward and leftward.

The pipe vibration control system of the present invention can be applied for both a normal pressurized type sprinkler and a normal suction type sprinkler, and can be hang as well from a ceiling.

The invention claimed is:

1. A pipe vibration control system comprising:
    a pipe vibration control device having a frame including vertical members fixed at a ceiling and arranged at both sides of the pipe and having lateral members fixed at the vertical members and arranged at the upper and the lower portions of the pipe,
    the vertical members and the lateral members constituting the frame to enclose the pipe under a no-contacted state while keeping spaces in upward, downward, rightward and leftward directions, and
    the pipe vibration control devices are arranged two or more locations around a pipe line of the pipe hung and supported at the ceiling and a pipe line in a direction crossing at a right angle with the pipe line.

2. A pipe vibration control system comprising:
    a pipe vibration control device having a frame including vertical members fixed at a ceiling and arranged at both sides of the pipe and having lateral members fixed at the vertical members and arranged at the upper and the lower portions of the pipe,
    the vertical members and the lateral members constituting the frame to enclose the pipe under a no-contacted state while keeping spaces in upward, downward, rightward and leftward directions, and the pipe vibration control devices are arranged two or more locations around a pipe line of a pipe hung and supported at a ceiling and an auxiliary pipe fixed in a direction toward a direction crossing at a right angle with the pipe.

3. The pipe vibration control system according to claim 1, wherein several long holes are formed at regularly intervals in a length direction of the vertical members and the lateral members of the pipe vibration control device.

4. The pipe vibration control system according to claim 1, wherein cushion materials are attached to the surfaces opposing against the pipes or the auxiliary pipes of the vertical members and the lateral members.

5. The pipe vibration control system according to claim 2, wherein several long holes are formed at regularly intervals in a length direction of the vertical members and the lateral members of the pipe vibration control device.

6. The pipe vibration control system according to claim 2, wherein cushion materials are attached to the surfaces opposing against the pipes or the auxiliary pipes of the vertical members and the lateral member.

7. The pipe vibration control system according to claim 3, wherein cushion materials are attached to the surfaces opposing against the pipes or the auxiliary pipes of the vertical members and the lateral members.

8. A pipe vibration control system for limiting the movement of a vibrationally excited pipe to a predetermined maximum movement, the pipe having a first pipe segment aligned along a first axis and a second pipe segment aligned along a second axis, the second axis at a substantially right angle relative to the first axis, the pipe supported by hangers attached to a support structure, the system comprising:

at least a first vibration control device attached to the support structure such that the first pipe segment passes through an opening of said first vibration control device;

at least a second vibration control device attached to the support structure such that the second pipe segment passes through an opening of said second vibration control device;

said vibration control devices each comprising:

spaced-apart first and second longitudinal members attached to the support structure, a longitudinal member positioned on opposite sides of a pipe segment and spaced selected distances therefrom and extending below the pipe segment;

a first lateral member extending between the spaced-apart longitudinal members and attached thereto at a position above the pipe with a selected distance between the first lateral member and the pipe segment;

a second lateral member extending between the spaced-apart longitudinal members and attached thereto at a position below the pipe segment with a selected distance between the second lateral member and the pipe segment;

wherein surfaces of portions of the spaced-apart first and second longitudinal members and surfaces of portions of the first and second lateral members define an opening through which a pipe segment passes, said first-mentioned and second-mentioned surfaces limiting movement of a vibrationally excited pipe segment to positions within said opening.

9. The pipe vibration control system of claim 8, wherein said longitudinal and said lateral members are provided with plural elongated slots.

10. The pipe vibration control system of claim 9, further comprising cushioning material attached to said first-mentioned and second-mentioned surfaces.

* * * * *